(12) United States Patent
Peters et al.

(10) Patent No.: US 8,955,418 B2
(45) Date of Patent: Feb. 17, 2015

(54) THREADED FASTENER DRIVING TOOL

(71) Applicant: Black & Decker Inc., Newark, DE (US)

(72) Inventors: Michael P. Peters, Lutherville, MD (US); Darren B. Moss, York, PA (US)

(73) Assignee: Black & Decker Inc., Newark, DE (US)

( * ) Notice: Subject to any disclaimer, the term of this patent is extended or adjusted under 35 U.S.C. 154(b) by 200 days.

(21) Appl. No.: 13/789,746

(22) Filed: Mar. 8, 2013

(65) Prior Publication Data

US 2014/0251095 A1 Sep. 11, 2014

(51) Int. Cl.
*B25B 15/00* (2006.01)
*B23P 15/00* (2006.01)
*B25B 23/00* (2006.01)

(52) U.S. Cl.
CPC ............... *B25B 15/002* (2013.01); *B23P 15/00* (2013.01); *B25B 15/001* (2013.01); *B25B 23/0007* (2013.01)
USPC ........... 81/460; 81/177.6; 81/121.1; 76/101.1

(58) Field of Classification Search
USPC ........ 81/436, 460, 121.1, 177.6, 52; 76/101.1
See application file for complete search history.

(56) References Cited

U.S. PATENT DOCUMENTS

| | | | |
|---|---|---|---|
| 1,738,405 A | 12/1929 | Thal | |
| 1,741,349 A | 12/1929 | Sullivan | |
| 1,782,981 A | 11/1930 | Anderson | |
| 1,899,489 A | 2/1933 | Wickbergh | |
| 2,046,840 A | 7/1936 | Phillips et al. | |
| 2,160,244 A | 5/1939 | West | |
| 2,173,707 A | 9/1939 | Brown | |
| 2,671,484 A | 3/1954 | Stevenson | |
| 3,234,982 A | 2/1966 | Stillwagon, Jr. | |
| 3,237,506 A | 3/1966 | Muenchinger | |
| 3,654,974 A | 4/1972 | Barnes | |
| 4,084,478 A | 4/1978 | Simmons | |
| 4,089,357 A | 5/1978 | Gill | |
| 4,187,892 A | 2/1980 | Simmons | |
| 4,355,552 A | 10/1982 | Gutshall | |
| 4,464,957 A | 8/1984 | Gill | |
| 4,878,406 A | 11/1989 | Simpson et al. | |
| D311,483 S | 10/1990 | Espin | |

(Continued)

FOREIGN PATENT DOCUMENTS

| | | |
|---|---|---|
| DE | 2231949.9 | 2/1973 |
| DE | 9400780.2 | 3/1994 |

(Continued)

*Primary Examiner* — David B Thomas
(74) *Attorney, Agent, or Firm* — Scott B. Markow

(57) ABSTRACT

A threaded fastener driving tool includes a proximal end portion, a distal driving head, and a torsion zone extending proximally from the driving head, The distal driving head has a central portion and a plurality of driving surfaces. Each pair of adjacent driving surfaces define a driving space therebetween. The driving surfaces and driving spaces are configured to engage a threaded fastener. The torsion zone includes a plurality of helical grooves bounded by non-cutting surfaces, each helical groove in communication with and extending proximally from at least one of the driving spaces. The helical grooves are configured to untwist and cause lengthening of the torsion zone when an input torque applied to the proximal end portion is insufficient to overcome an output resistance torque at the driving head. The torsion zone may comprise a plurality of twisted wires or cables. A method of manufacturing the driving tool is disclosed.

20 Claims, 15 Drawing Sheets

(56) References Cited

U.S. PATENT DOCUMENTS

| | | | |
|---|---|---|---|
| 4,998,454 A | 3/1991 | Chaconas et al. | |
| 5,259,279 A | 11/1993 | Strauch | |
| 5,704,261 A | 1/1998 | Strauch et al. | |
| 5,868,047 A | 2/1999 | Faust et al. | |
| D410,372 S | 6/1999 | Strauch | |
| 5,953,969 A | 9/1999 | Rosenhan | |
| D431,768 S | 10/2000 | Feik | |
| 6,152,000 A | 11/2000 | Mowins | |
| 6,164,171 A | 12/2000 | Kaneko et al. | |
| 6,223,634 B1 | 5/2001 | Hughes et al. | |
| D455,943 S | 4/2002 | Lin | |
| 6,397,710 B1 | 6/2002 | Baker | |
| 6,655,241 B2 | 12/2003 | Kozak | |
| 6,761,089 B2 | 7/2004 | Bergamo | |
| 6,883,405 B2 | 4/2005 | Strauch | |
| 7,437,979 B1* | 10/2008 | Wang | 81/436 |
| D624,382 S | 9/2010 | Loniewski et al. | |
| 8,117,950 B2* | 2/2012 | Kozak et al. | 81/177.6 |
| 8,176,818 B2* | 5/2012 | Meng | 81/180.1 |
| 2005/0076749 A1 | 4/2005 | Liu | |
| 2007/0051215 A1 | 3/2007 | Petillo | |
| 2007/0101835 A1 | 5/2007 | Totsu | |
| 2010/0064860 A1* | 3/2010 | Kozak et al. | 81/177.6 |
| 2010/0269264 A1* | 10/2010 | Huang | 7/169 |
| 2010/0288086 A1 | 11/2010 | Huang | |
| 2011/0083534 A1* | 4/2011 | Kozak et al. | 81/177.8 |

FOREIGN PATENT DOCUMENTS

| | | |
|---|---|---|
| DE | 4300446 | 6/1994 |
| DE | 4339991 | 6/1995 |
| DE | 19932369.0 | 1/2001 |
| DE | 20201012.0 | 5/2002 |
| DE | 20211316.7 | 10/2002 |
| DE | 20303790.1 | 7/2003 |
| DE | 20319213.3 | 4/2005 |
| DE | 102007016000.5 | 1/2008 |
| DE | 202007016650.8 | 3/2008 |
| DE | 102007041574.7 | 3/2009 |
| DE | 202008015046.9 | 3/2009 |
| DE | 202009003137.3 | 6/2009 |
| DE | 202011000145.8 | 3/2011 |
| EP | 0336136 | 10/1989 |
| EP | 0439501 | 8/1991 |
| EP | 0610693 | 8/1994 |
| EP | 0675782 | 10/1995 |
| EP | 0741633 | 11/1996 |
| EP | 0820530 | 1/1998 |
| EP | 0988134 | 3/2000 |
| EP | 1010157 | 6/2000 |
| EP | 1019641 | 7/2000 |
| EP | 03014066.9 | 6/2003 |
| EP | 1327499 | 7/2003 |
| EP | 08004113.0 | 3/2008 |
| EP | 08016248.0 | 9/2008 |
| EP | 08019149.7 | 10/2008 |
| EP | 09154462.7 | 3/2009 |
| JP | 3147157 | 12/2008 |
| WO | 2006105920 | 10/2006 |
| WO | 2007120893 | 10/2007 |
| WO | 2010054169 | 5/2010 |

* cited by examiner

THREADED FASTENER DRIVING TOOL

TECHNICAL FIELD

This application relates to a driving tool, e.g., a threaded fastener driving tool, configured to drive a threaded fastener.

BACKGROUND

Threaded fastener driving tools, such as hand-held screwdrivers and nut drivers, screwdriving and nut driving bits, and holders for screwdriving and nut driving bits, are used to insert and remove threaded fasteners, such as screws and nuts, from a workpiece. In many instances, the threaded fastener driving tool may fail (e.g., by cracking or breaking) or may cam-out from the head of a threaded fastener. This may occur, for example, when the torque applied to the threaded fastener driving tool is greater than the output resistance encountered by the threaded fastener driving tool or threaded fastener, and the user or power tool continues to apply greater input torque to the threaded fastener driving tool. This is particularly true when threaded fastener driving tools are used with power tools, especially those power tools, such as impact drivers, that apply rotational blows to the threaded fastener driving tool. Certain types of threaded fastener driving tools may include a torsion zone having reduced strength or size to take up some of the torsional stresses. However, these types of threaded fastener driving tools still may suffer from excessive instances of cam-out or may still fail.

SUMMARY

In one aspect, a threaded fastener driving tool includes a proximal end portion and a distal driving head having a plurality of driving surfaces configured to engage a threaded fastener. A torsion zone extends proximally from the driving head. The torsion zone is composed of a plurality of wires or cables twisted together in a helical pattern.

Implementations of this aspect may include one or more of the following features. The twisted wires or cables may define helical grooves and helical non-cutting surfaces. The helical grooves have a twist direction that is the same as the twist direction of threads of a fastener to be inserted into a workpiece. The plurality of wires or cables may be configured to cause lengthening of the torsion zone when an input torque applied to the proximal end portion is insufficient to overcome an output resistance torque at the driving head. The plurality wires or cables may be configured to at least partially untwist when an input torque applied to the proximal end portion is insufficient to overcome a torque resistance at the driving head. The plurality of twisted wires or cables comprise a first set of wires or cables composed of a first material having a first material property and a second set of wires or cables composed of a second material having a second, different material property. The distal driving head may be configured as one of a flat head screwdriving head, a Phillips screwdriving head, a male hex-shaped driving head, a male square-shaped driving head, a male star-shaped driving head, a female nut-driving head, and a tool bit holder. The proximal end portion may include one of: (i) a shank of polygonal cross section configured to the removably coupled to a power tool; (ii) a tool handle; and (iii) a proximal driving head.

In another aspect, a threaded fastener driving tool defines a longitudinal axis and includes a proximal end portion, a distal driving head, and a torsion zone extending proximally from the driving head, The distal driving head has a central portion and a plurality of driving surfaces. Each pair of adjacent driving surfaces define a driving space therebetween. The driving surfaces and driving spaces are configured to engage a threaded fastener. The torsion zone includes a plurality of helical grooves bounded by non-cutting surfaces, each helical groove in communication with and extending proximally from at least one of the driving spaces.

Implementations of this aspect may include one or more of the following aspects. The helical grooves may be configured to cause lengthening of the torsion zone when an input torque applied to the proximal end portion is insufficient to overcome an output resistance torque at the driving head. The helical grooves may be configured to at least partially untwist when an input torque applied to the proximal end portion is insufficient to overcome a torque resistance at the driving head. The helical grooves have a twist direction that is the same as the twist direction of threads of a fastener to be inserted into a workpiece. The torsion zone and helical grooves may comprise a plurality of twisted wires or cables. The plurality of twisted wires or cables comprise a first set of wires or cables may be composed of a first material having a first material property and a second set of wires or cables composed of a second material having a second, different material property. The driving surfaces and driving spaces may be configured as one of a flat head screwdriving head, a Phillips screwdriving head, a male hex-shaped driving head, a male square-shaped driving head, and a male star-shaped driving head. The proximal end portion may include one of: (i) a shank of polygonal cross section configured to the removably coupled to a power tool; (ii) a tool handle; and (iii) a proximal driving head.

In another aspect, a method of manufacturing a threaded fastener driving tool may include the following steps. A plurality of wires or cables is twisted together in a helical pattern. The plurality of twisted wires or cables is heated and mechanically worked to form a torsion zone of the threaded fastener driving tool. A driving head configured to drive a threaded fasteners formed at a distal end portion of the torsion zone.

Implementations of this method may include one or more of the following. The plurality of wires or cables may include a first set of wires or cables composed of a first material having a first material property together with a second set of wires or cables composed of a second material having a second, different material property. Forming the driving head may include forging the driving head from the distal end portion, or may include coupling a driving head component to the distal end portion.

Advantages may include one or more of the following. The torsion zone absorbs excess energy when the output resistance torque exceeds an input torque, and a greater input torque is applied to the threaded fastener driving tool. The torsion zone also lengthens when the output resistance torque exceeds an input torque, and greater input torque is applied to the threaded fastener driving tool, which inhibits cam out from and stripping of a fastener head. The threaded fastener driving tool may comprise a composite structure with material properties that vary throughout the tool, which may enable a stronger, more durable, and more torque resistant threaded fastener driving tool. These and other advantages and features will be apparent from the description, the drawings, and the claims.

DETAILED DESCRIPTION

Figure 1:
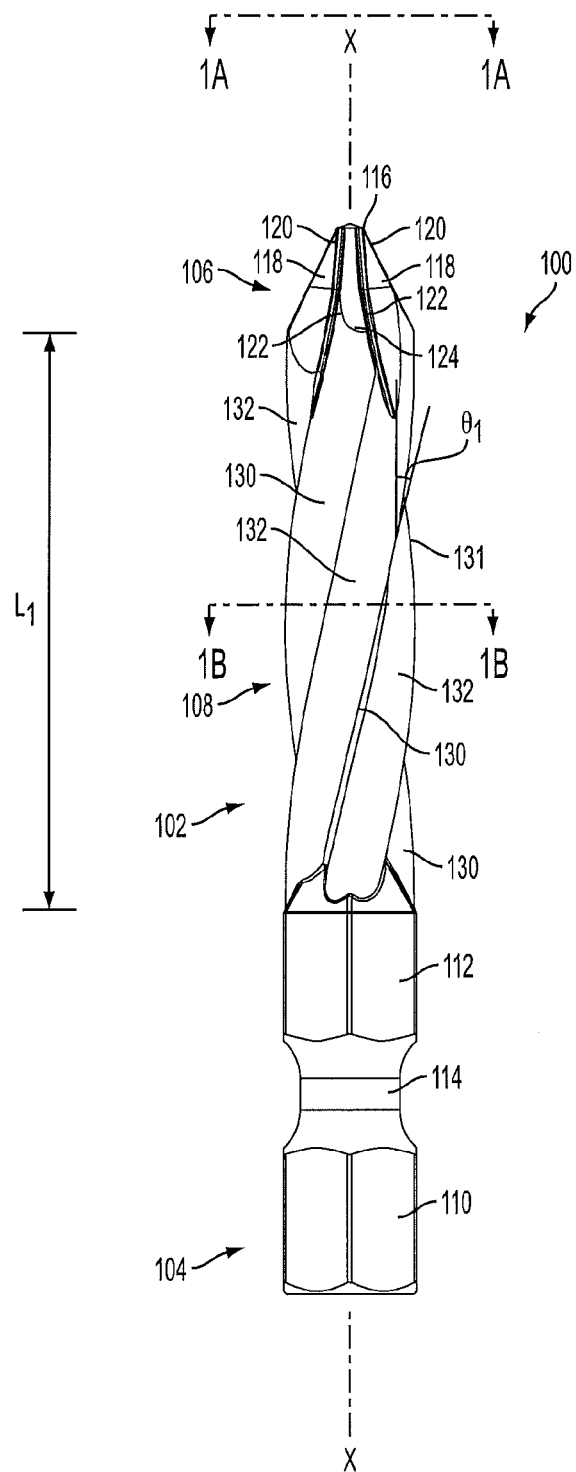
FIG. 1 is a perspective view of a first embodiment of a threaded fastener driving tool.

Referring to FIG. 1, a threaded fastener driving tool 100 includes a shaft-like body 102 defining a longitudinal axis X. The body 102 has a proximal end portion 104, a distal driving head 106, and an intermediate torsion zone 108. In the illustrated example, the proximal end portion 104 includes a shank composed of a first shank portion 110 of polygonal (e.g., hexagonal) cross-section, a second shank portion 112 of the same polygonal (e.g., hexagonal) cross-section, and an intermediate annular groove 114. However, as discussed below, the proximal end portion may have alternative configurations.

Figure 1A:
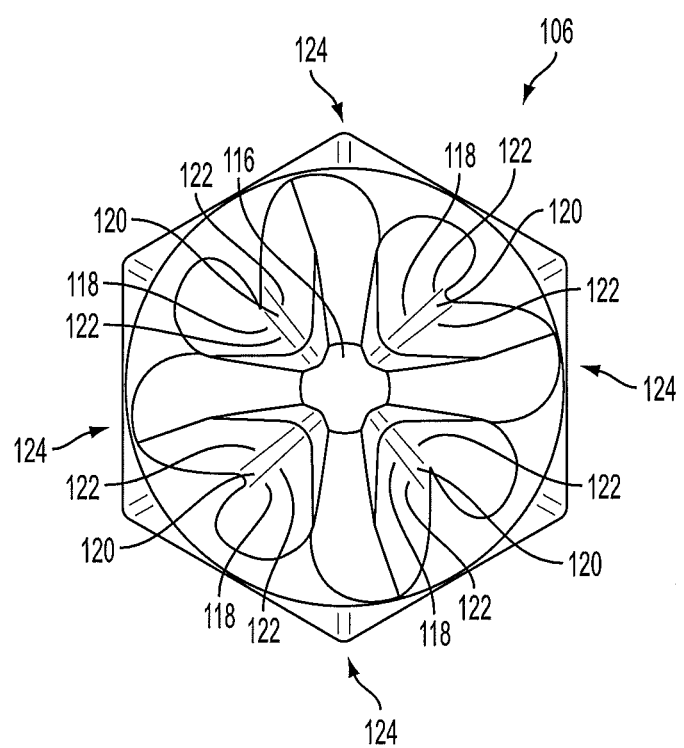
FIG. 1A is a top end view of the driving tool of FIG. 1, taken along line 1A-1A in FIG. 1.

Referring also to FIG. 1A, the distal driving head 106 comprises a screwdriving head with a central portion or tip 116 generally aligned with the longitudinal axis X. The distal driving head 106 has a plurality of driving surfaces in the form of blades 118 that extend radially outward from the central portion 116. Each driving surface or blade 118 has a distal edge 120 extending radially outward from the central portion substantially transverse to the longitudinal axis X. Each driving surface or blade 118 has a pair of lateral faces 122 extending from the distal edge 120 generally parallel to the longitudinal axis X. Defined between each pair of adjacent driving surface or blade 118 is a driving space 124. The driving surfaces or blades 118 are configured to engage one or more slots defined in a head of a fastener (not shown in FIG. 1). In the embodiment of FIG. 1, there are two pairs of diametrically opposed blades 118 arranged together to form a Phillips driving head configuration. As discussed below, the distal driving head may have alternative configurations.

Figure 1B:
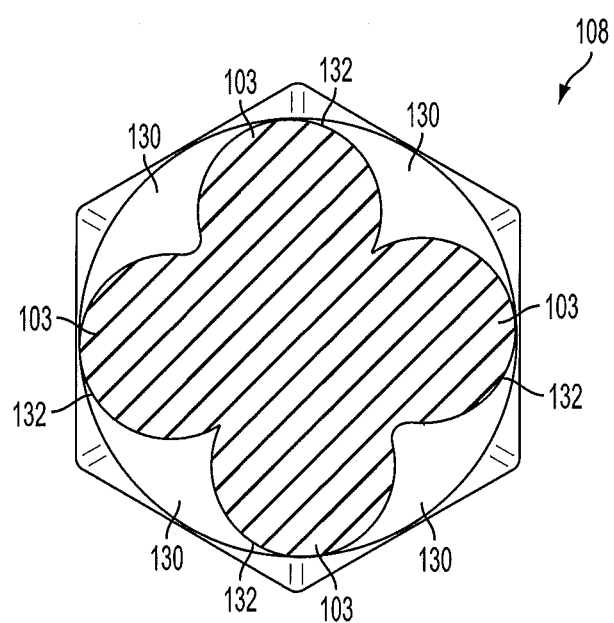
FIG. 1B is a cross-sectional view of the tool of FIG. 1, taken along line 1B-1B in FIG. 1.

Referring also to FIG. 1B, the intermediate torsion zone 108 has a length L1 and is formed by a plurality of twisted wires or cables 103. The twisted wires or cables 103 together define a plurality of helical grooves 130 oriented at a pitch angle θ1 relative to the longitudinal axis X. Each of the helical grooves 130 may be in communication with and extend proximally from one of the driving spaces 124 in the driving head 106. Each of the helical grooves 130 is bounded on either side by a helical non-cutting surfaces 132 defined by the surfaces of the wires or cables 103. Each of the non-cutting surfaces 132 is connected to and extends proximally from one of the blades 118 in the driving head 106. In the embodiment of FIG. 1, the each of the non-cutting surfaces 132 has a substantially convex outer surface between adjacent grooves 130. In the embodiment of FIG. 1, there are four helical grooves 130 and four helical non-cutting surfaces 132, corresponding to the four driving spaces 124 and the four blades 118 in the driving head 106. However, it should be understood that number of helical grooves and non-cutting surfaces may differ from the number of driving spaces and blades in the driving head. For example, if smaller gauge wire or cable is used, there may be a substantially greater number of wires or cables, and thus a substantially greater number of grooves and non-cutting surfaces.

Figure 2:
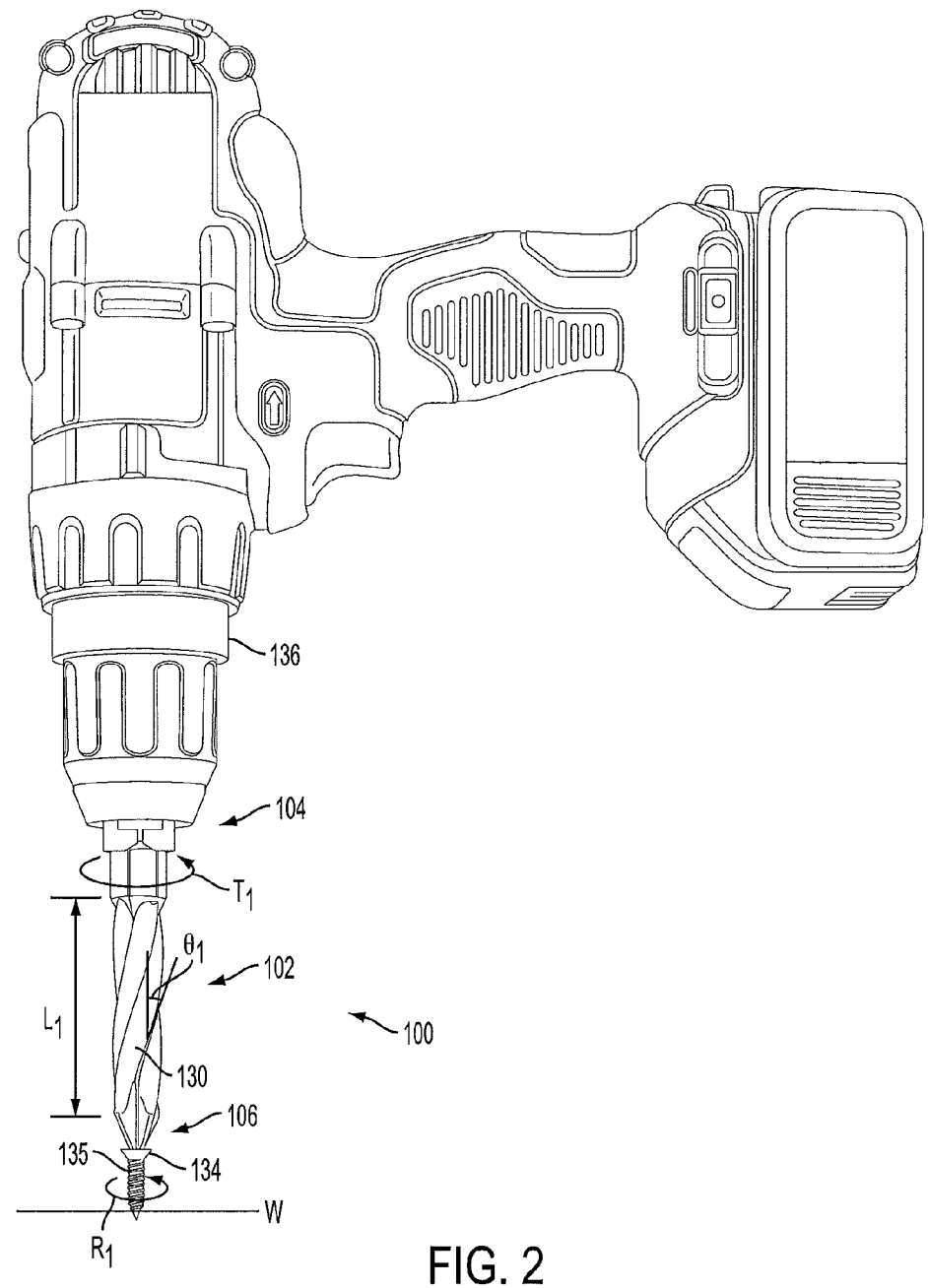
FIG. 2 is a perspective view showing the threaded fastener driving tool of FIG. 1 engaging a fastener in an unloaded condition.
Figure 3:
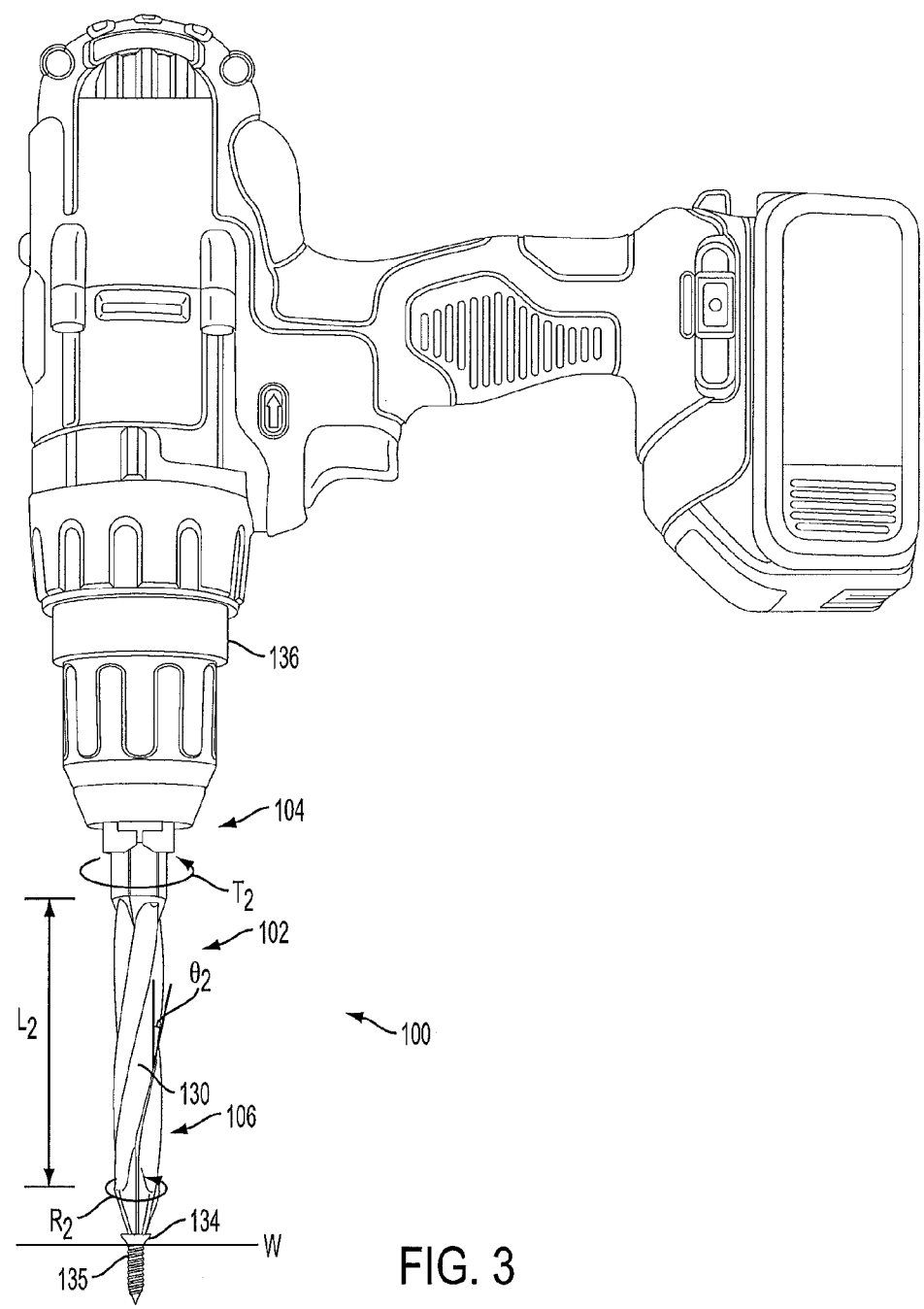
FIG. 3 is a perspective view showing the threaded fastener driving tool of FIG. 1 engaging a fastener in an excessively loaded condition.

FIGS. 2 and 3 illustrate the threaded fastener driving tool 100 of FIG. 1 in use to drive a threaded fastener 134 (e.g. a screw) into a workpiece W (e.g., a piece of wood or metal), using a power tool generally indicated at 136. Referring to FIG. 1, when an input torque T1 applied to the proximal end portion 104 of the threaded fastener driving tool 100 is greater than or equal to an output resistance torque R1 encountered at the distal driving end 106 of the threaded fastener driving tool 100, the input torque is sufficient to causes the threaded fastener driving tool 100 to drive the fastener 134 into the workpiece W. When this occurs, the helical grooves 130 remain substantially undeformed and the torsion zone remains substantially at its length L1.

Referring to FIG. 3, when an input torque T2 is less than an output resistance torque R2 encountered at the distal driving head 106 of the threaded fastener driving tool 100, the input torque is insufficient to overcome the resistance torque and to drive the fastener 134 into the workpiece. This may occur, for example, when the fastener 134 encounters a workpiece region of higher resistance. In an ordinary threaded fastener driving tool, when this happens, the user may cause the power tool 136 to apply a greater input torque, which may cause the driving head to cam out or strip the head of the fastener, or may cause failure or breakage of the screwdriving bit. However, when this occurs with threaded fastener driving tool 100, the helical grooves 130 temporarily elastically deform by untwisting to a pitch angle of θ2 that is less than the pitch angle θ. This in turn causes the torsion zone 108 to increase to a second, greater length L2. By untwisting, the torsion zone 108 absorbs at least a portion of excess energy and, by lengthening, inhibits the driving head from camming out or striping the head of the fastener.

Referring again to FIGS. 2 and 3, the orientation of the helical grooves 130 is the same as the orientation of the threads 135 on the fastener 134 to facilitate inserting the fastener into the workpiece W. In this example, both the helical grooves 130 and the threads 135 have a right-handed twist. To facilitate removing the same fastener 134 from the workpiece, a similar threaded fastener driving tool could be designed having grooves with a left-handed twist. Similarly, a threaded fastener driving tool with grooves having a left-handed twist could be used for inserting a fastener with threads having a left-handed twist, while the threaded fastener driving tool 100 having grooves with a right-handed twist could be used for removing a fastener having threads with a left-handed twist.

Figure 4:
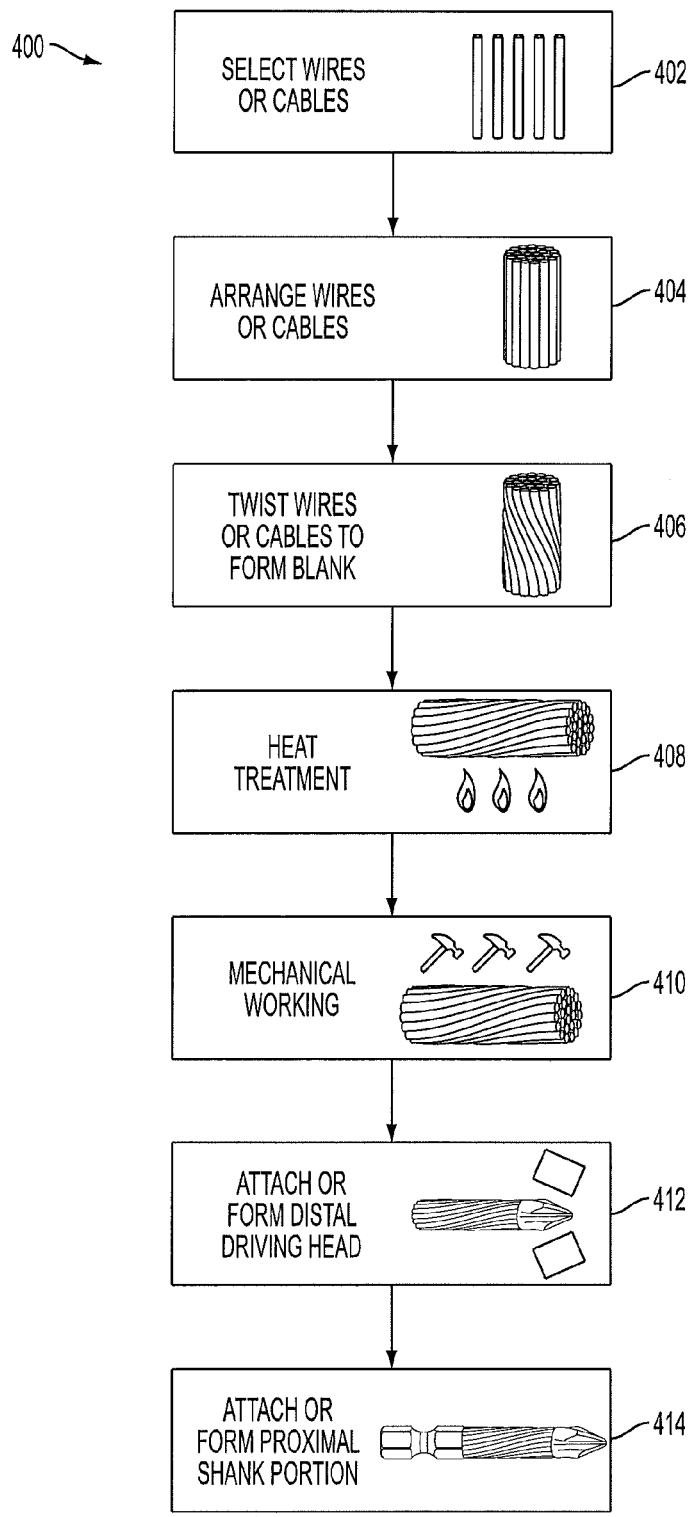
FIG. 4 is a schematic depiction of a manufacturing process for the threaded fastener driving tool of FIG. 1.

Referring to FIG. 4, the threaded fastener driving tool 100 may be formed, e.g., by a manufacturing process 400 having the following steps. At step 402, a plurality of cables, wires, or cable or wire strands are selected as the base material(s) to form the threaded fastener driving tool. The cables or wires can all be the same material (e.g., S2 steel or another metal), or may comprise wires or cables composed of various different materials. For example, one may select cables or wires having various different material properties, e.g., some that are more ductile (e.g., 1018 steel), and some that are stronger or more wear resistant (e.g., S2 steel).

At step 404, the selected cables or wires are arranged or grouped together to form a cylinder that resembles a larger cable composed of the plurality of cables or wires. If cables or wires of different types of materials are selected, they may be arranged in a desired manner, e.g., with more ductile cables or wires on an interior of the cylinder, and more wear resistant cables or wires on the outside surface of the cylinder. At step 406, the cables or wires are twisted or wound together in a helical pattern. At step 408, the twisted wires or cables are heated in a desired manner, e.g., in a furnace or using an inductive coil. At step 410, while still hot, the twisted cables or wires are mechanically worked to mechanically and/or chemically interconnect, link, bind, and/or bond the cables or wires together. This may be done, e.g., by repeatedly striking the twisted cables or wires, e.g., with one or more hammers, while rotating the twisted wires and cables about a longitudinal axis, or by pressing in a die set. This forms the torsion zone of the fastener driving tool. Next, at step 412, the distal driving head may be attached to the distal end of the torsion zone (e.g., by brazing or welding), or may be formed from a distal portion of the torsion zone (e.g., by applying a die forge to a distal tip portion of the torsion zone). At step 414, the proximal shank portion may be attached to the proximal end of the torsion zone (e.g., by brazing or welding), or may be formed from a proximal portion of the torsion zone (e.g., by die forging or by upsetting). According to the process, the plurality of twisted wires or cables that comprise the torsion zone act as a composite material, and may have material properties that vary throughout the torsion zone. For example, an interior portion of the torsion zone may be formed of cables or wires that are more ductile, while a peripheral portion of the torsion zone may be formed of cables or wires that are harder or more wear resistant. In the torsion zone, the twisted wires or cables together define helical grooves between adjacent wires or cables, non-cutting surfaces defined by the surfaces of the wires or cables.

Figure 5:
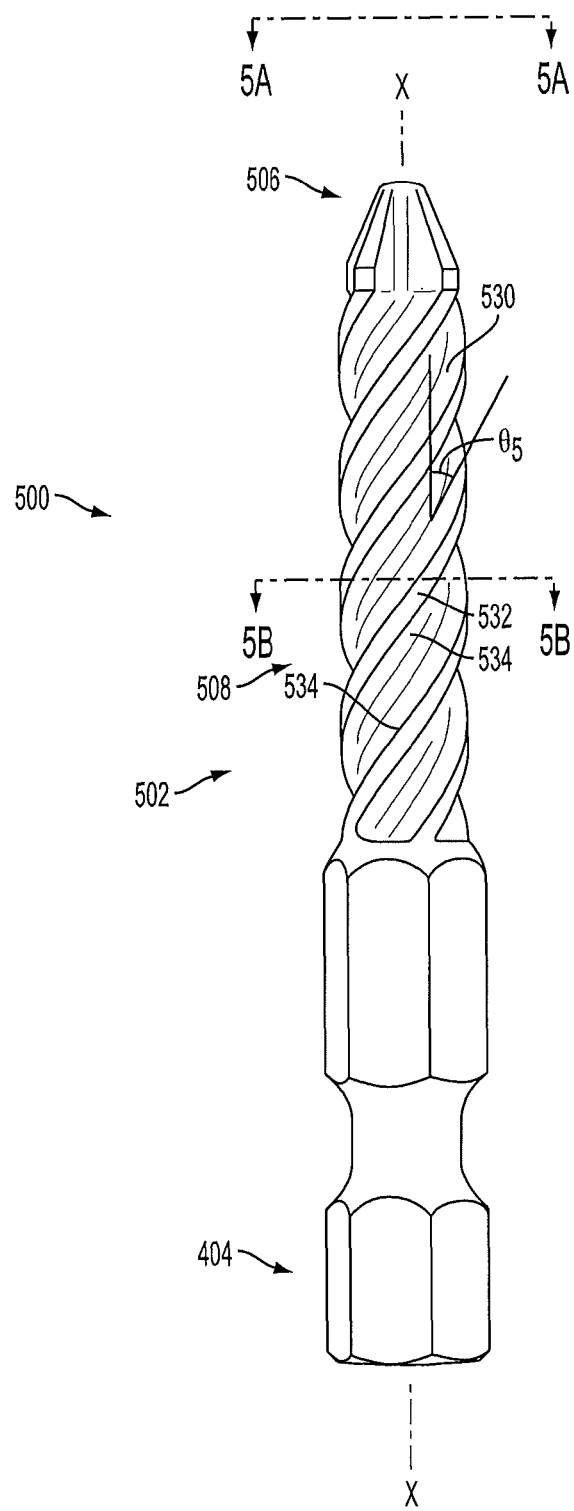
FIG. 5 is a perspective view of a second embodiment of a threaded fastener driving tool.
Figure 5A:
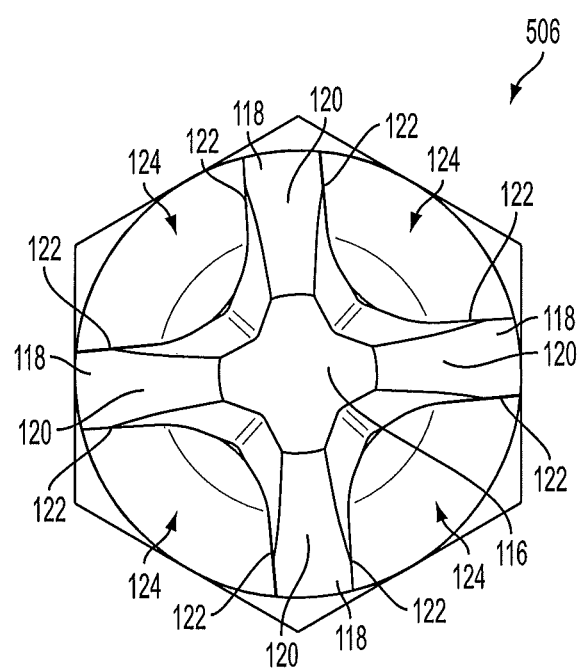
FIG. 5A is a top end view of the driving tool of FIG. 5, taken along line 5A-5A in FIG. 5.
Figure 5B:
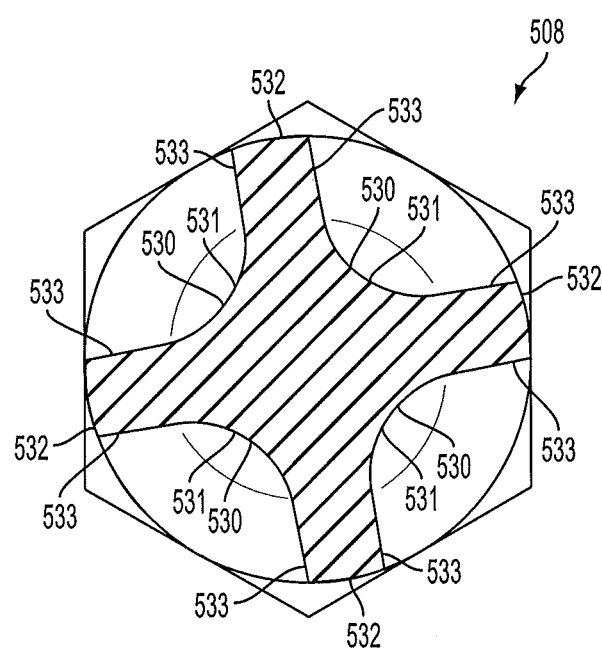
FIG. 5B is a cross-sectional view of the tool of FIG. 5, taken along line 5B-5B in FIG. 5.

Referring to FIGS. 5, 5A and 5B, in another embodiment, a threaded fastener driving tool 500 includes a shaft-like body 502, a proximal end portion 504, a distal driving head 506, and an intermediate torsion zone 508, similar to the body 102, proximal end portion 104, distal driving head 106, and the torsion zone 108 of the threaded fastener driving tool 100 illustrated in FIG. 1. The threaded fastener driving tool 500 differs from the threaded fastener driving tool 100 mainly in three aspects. First, the pitch angle θ5 of the helical grooves 530 relative to the longitudinal axis X is greater than the pitch angle θ1 of the helical grooves 130. Second, each of the helical non-cutting surfaces 532 comprises a generally arc-shaped surface that is coincident with the outer diameter of the torsion zone 508. In an alternative embodiment, one or more of the non-cutting surfaces may comprise a generally flat surface that is generally tangential to the outer circumference of the torsion zone 508 or a Third, each of the helical grooves 530 comprise a generally concave surface 531 extending to a pair of generally radial legs 533, which intersect the adjacent non-cutting surfaces 532. These configurations of grooves and non-cutting surfaces may be formed by milling or another type of machining process. This milling or machining process may be performed on a plurality of twisted wires or cables (as discussed above), or may be performed on a blank of material, such as a metal alloy, a plastic, or a composite material. It should be understood that this torsion zone configuration can be used with any of the other fastener driving tools disclosed herein.

Figure 6:
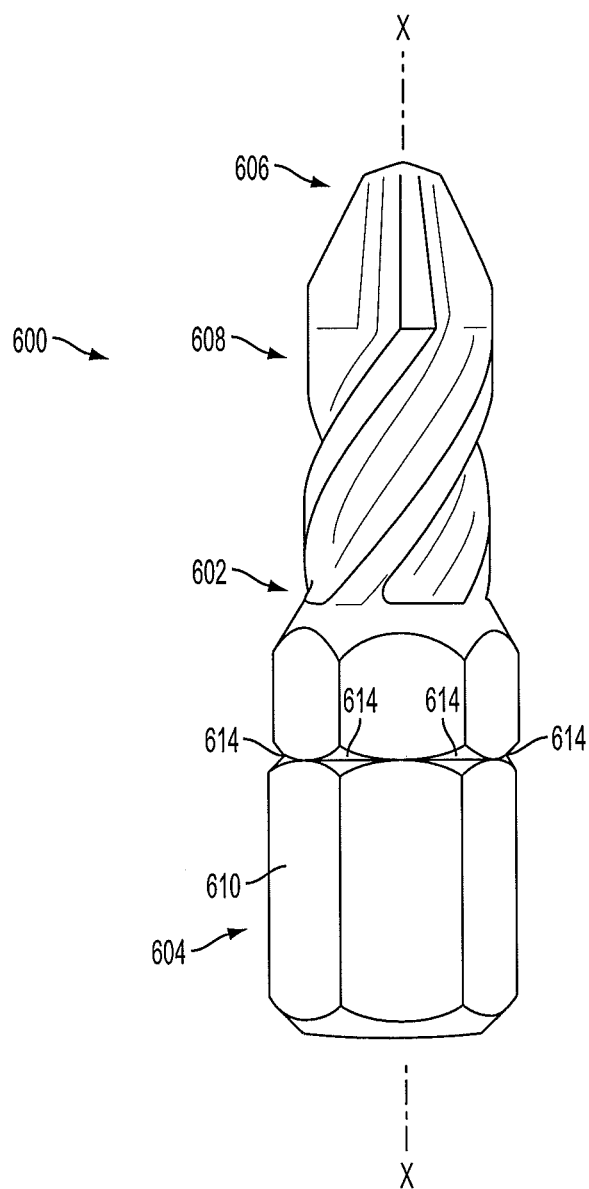
FIG. 6 is a perspective view of a third embodiment of a threaded fastener driving tool.

Referring to FIG. 6, in another embodiment, a threaded fastener driving tool 600 includes a shaft-like body 602, a proximal end portion 604, a distal driving head 606, and an intermediate torsion zone 608, similar to the body 502, proximal end portion 504, distal driving head 506, and the torsion zone 508 of the threaded fastener driving tool 500 illustrated in FIG. 5. The threaded fastener driving tool 600 differs from the threaded fastener driving tool 500 mainly in the length of the torsion zone 608 (which is shorter than the length of the torsion zone 508), and in the configuration of the proximal end portion 604. The proximal end portion 604 the a shank portion 610 of polygonal (in this example hexagonal) cross-section A plurality of V-shaped notches 614 are formed at vertices of the polygonal shank portion 610. The V-shaped notches 614 facilitate retaining the threaded fastener driving tool 600 in a tool holder. It should be understood that this proximal end portion may also be used with any of the other fastening driving tools disclosed herein.

Figures 7A, 7B:
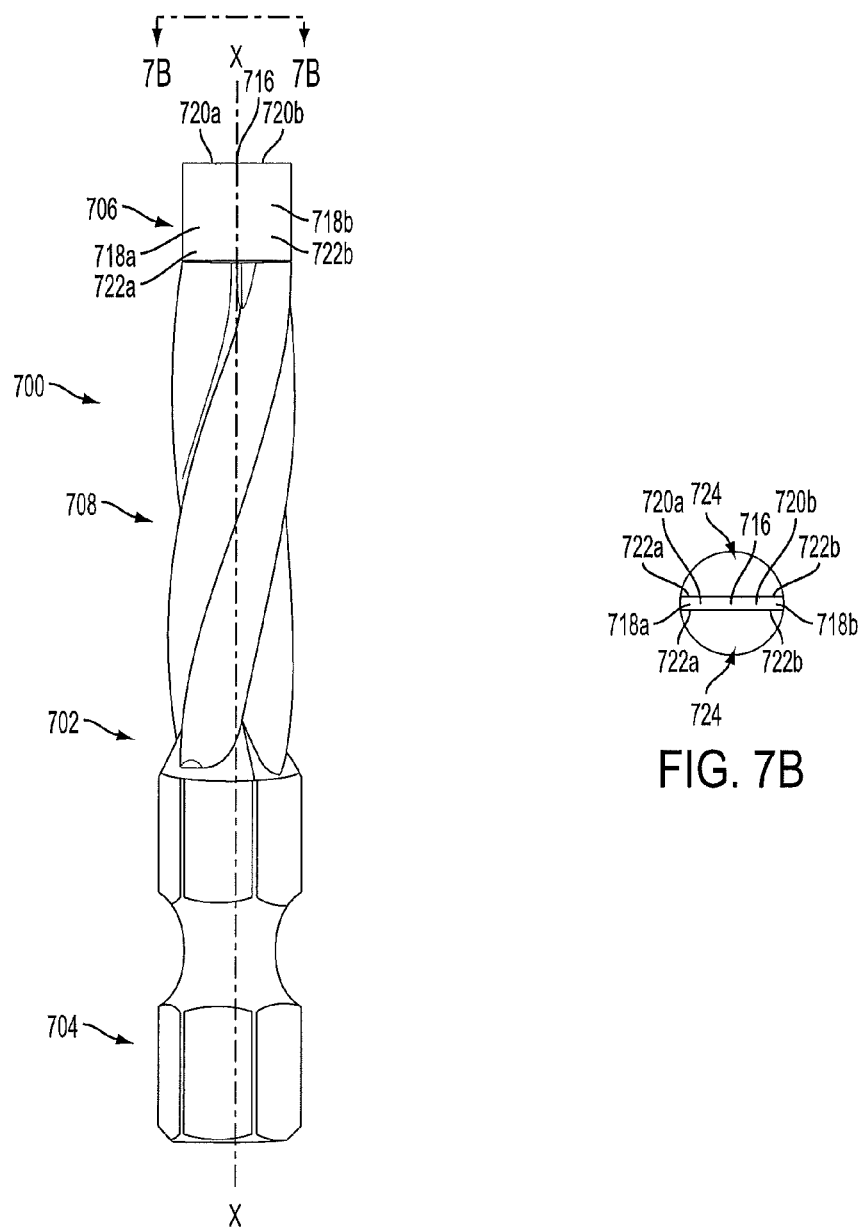
FIG. 7A is a perspective view of a fourth embodiment of a threaded fastener driving tool
FIG. 7B is an end view of the threaded fastener driving tool of FIG. 7A.

Referring to FIGS. 7A and 7B, in another embodiment, a threaded fastener driving tool 700 includes a shaft-like body 702, a proximal end portion 704, a distal driving head 706, and an intermediate torsion zone 708, similar to the body 102, proximal end portion 104, distal driving head 106, and the torsion zone 108 of the threaded fastener driving tool 100 illustrated in FIG. 1. The threaded fastener driving tool 700 differs from the threaded fastener driving tool 100 mainly in the configuration of the distal driving head 706. The distal driving head 706 has a central portion 716 generally aligned with the longitudinal axis X. The distal driving head 706 also has a plurality of driving surfaces in the form of a pair of blades 718a and 718b that extend radially outward from the central portion 716, Each driving surface or blade 718a, 718b has a distal edge 720a, 720b extending radially outward from the central portion substantially transverse to the longitudinal axis X. Each driving surface or blade has a pair of lateral faces 722a, 722b extending from the respective distal edge 720a, 720b generally parallel to the longitudinal axis X. Defined between each pair of adjacent driving surfaces or blades is a driving space 724. The driving surfaces or blades 718a, 718b are diametrically opposed to each other and collinear to form a flat head driving head to engage a slot in the head of a screw. It should be understood, that the flat head driving head may be used with any of the other fastening driving tools disclosed herein.

Figure 8:
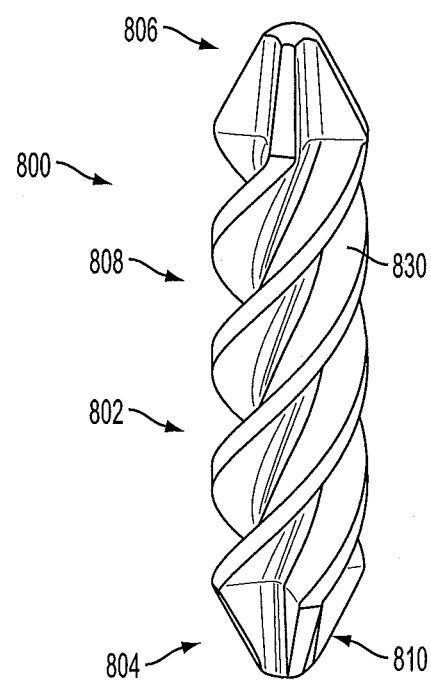
FIG. 8 is a perspective view of a fifth embodiment of a threaded fastener driving tool.

Referring to FIG. 8, in another embodiment, a threaded fastener driving tool 800 includes a shaft-like body 802, a proximal end portion 804, a distal driving head 806, and an intermediate torsion zone 808, similar to the body 102, proximal end portion 104, distal driving head 106, and the torsion zone 108 of the threaded fastener driving tool 100 illustrated in FIG. 1. The threaded fastener driving tool 800 differs from the threaded fastener driving tool 100 in that the proximal end portion 804 comprises a driving head 810. The driving head 810 may be similar in design to the driving head 806 at the distal end (e.g., a Phillips head) or may be different (e.g., a flat head). When the distal end driving head 806 is used to drive a fastener, the grooves 830 are oriented in a helix having a right-handed twist, suitable for inserting a fastener having threads with a right-handed twist and removing a fastener having threads with a left-handed twist. When the proximal end driving head 810 is used to drive a fastener, the grooves 830 are oriented in a helix having a left-handed twist, suitable for inserting a fastener having threads with a left-handed twist, and removing a fastener having threads with a right-handed twist. The tool 800 may include indicia (e.g., color coding, symbols, words) to indicate which of the heads is suitable for use with which type of fastener. It should be understood that the proximal driving head may be used with any of the other fastener driving tools disclosed herein.

Figure 9:
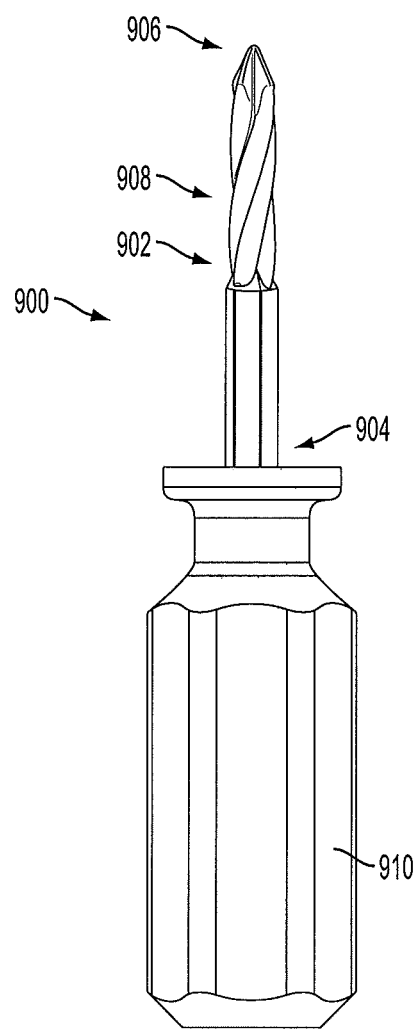
FIG. 9 is a perspective view of a sixth embodiment of a threaded fastener driving tool.

Referring to FIG. 9, in another embodiment, a threaded fastener driving tool 900 includes a shaft-like body 902, a proximal end portion 904, a distal driving head 906, and an intermediate torsion zone 908, similar to the body 102, proximal end portion 104, distal driving head 106, and the torsion zone 108 of the threaded fastener driving tool 100 illustrated in FIG. 1. The threaded fastener driving tool 900 differs from the threaded fastener driving tool 100 in that the proximal end portion 910 comprises a handle 910 connected to the body 902. This enables the threaded fastener driving tool 900 to be used like a manual screwdriver. It should be understood that the proximal handle may be used with any of the other fastener driving tools disclosed herein.

Figure 10:
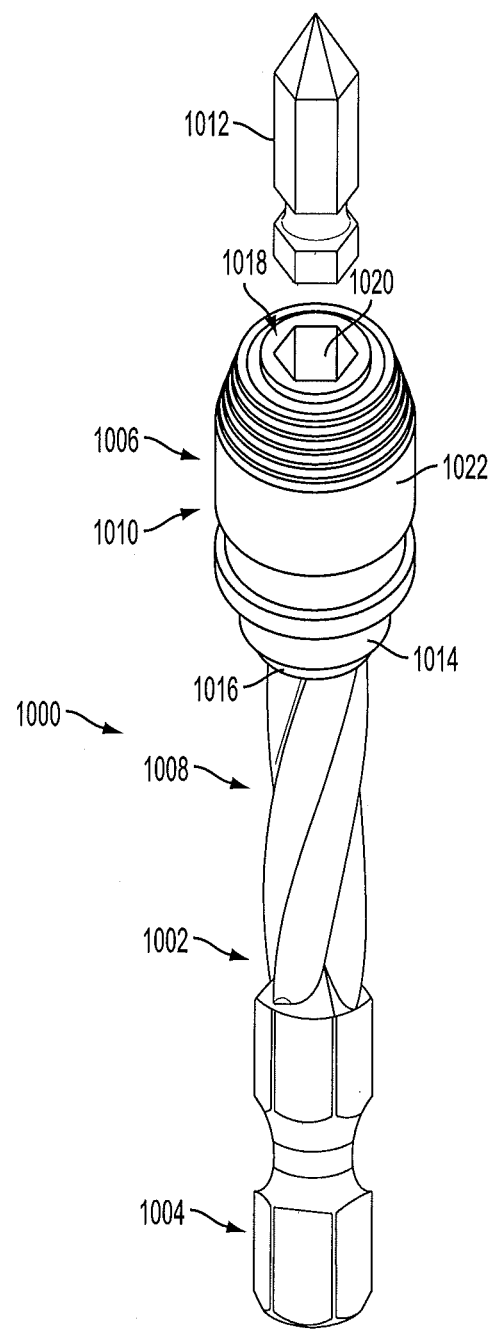
FIG. 10 is a perspective view of a seventh embodiment of a threaded fastener driving, tool.

Referring to FIG. 10, in another embodiment, a threaded fastener driving tool 1000 includes a shaft-like body 1002, a proximal end portion 1004, a distal driving head 1006, and an intermediate torsion zone 1008, similar to the body 102, proximal end portion 104, distal driving head 106, and the torsion zone 108 of the threaded fastener driving tool 100 illustrated in FIG. 1. The threaded fastener driving tool 1000 differs from the threaded fastener driving tool 100 in that the distal driving head 1006 is configured as a tool holder 1010 for releasably coupling a tool bit 1012 such as a screwdriving bit to the tool 1000. The tool holder 1010 may include a body 1014 having a proximal end 1016 connected to the distal end of the torsion zone 1008, and a distal end 1018 that defines a bore 1020 (in this example a polygonal bore) for receiving the bit 1012. Inside the bore may be a retaining structure (not shown), such as a spring clip, an O-ring, a magnet, and/or a retaining ball or pin, to facilitate retaining the bit 1012 in the bore 1018. The tool holder 1010 may further include an outer sleeve 1022 that is moveable axially relative to the body 1014 between a first position in which the bit is lockably retained in the bore, and a second position in which the bit may be released from or inserted into the bore. By way of example only, the tool holder may have a configuration similar to those shown in U.S. Pat. No. 6,929,266, which is incorporated by reference. Other configurations of bit holders are known to those of skill in the art. It should be understood that these and other bit holders may be used with any of the fastener driving tools disclosed herein.

Figure 11A:
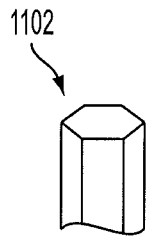
FIGS. 11A-11D are perspective views of alternative embodiments for the distal driving head for use with the aforementioned threaded fastener driving tools.
Figure 11B:
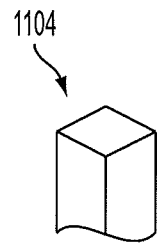
Figure 11C:
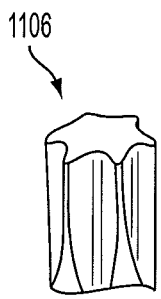
Figure 11D:
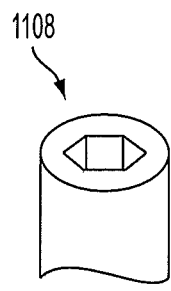

Numerous modifications may be made to the exemplary implementations described above. For example, any of the aforementioned tools may have a distal driving head configured as a male hex-shaped (Allen wrench) driving head 1102 (FIG. 11A), a male square-shaped driving head 1104 (FIG. 11B), a male star-shaped driving head (FIG. 11C), or a female hex-shaped socket 1108 for nutdriving (FIG. 11D). The length of the torsion zone, the number of wires or cables in the torsion zone, and/or the pitch angle of the helical grooves and helical non-cutting surfaces in the torsion zone can be varied, and can vary over the length of the torsion zone. The twisted wires or cables can be braided, wound, or otherwise twisted together. The proximal end portion can have other configurations such as square or round. These and other implementations are within the scope of the following claims.

What is claimed is:

1. A threaded fastener driving tool comprising:
   a proximal end portion;
   a distal driving head having a plurality of driving surfaces configured to engage a threaded fastener; and
   a torsion zone extending proximally from the driving head, the torsion zone composed of a plurality of wires or cables twisted together in a helical configuration.

2. The threaded fastener driving tool of claim 1, wherein the twisted wires or cables define helical grooves and helical non-cutting surfaces.

3. The threaded fastener driving tool of claim 1, wherein the helical grooves have a twist direction that is the same as the twist direction of threads of a fastener to be inserted into a workpiece.

4. The threaded fastener driving tool of claim 1, wherein the plurality of wires or cables are configured to cause lengthening of the torsion zone when an input torque applied to the proximal end portion is insufficient to overcome an output resistance torque at the driving head.

5. The threaded fastener driving tool of claim 1, wherein the plurality wires or cables are configured to at least partially untwist when an input torque applied to the proximal end portion is insufficient to overcome a torque resistance at the driving head.

6. The threaded fastener driving tool of claim 1, wherein the plurality of twisted wires or cables comprise a first set of wires or cables composed of a first material having a first material property and a second set of wires or cables composed of a second material having a second, different material property.

7. The threaded fastener driving tool of claim 1, wherein the distal driving head is configured as one of a flat head screwdriving head, a Phillips screwdriving head, a male hex-shaped driving head, a male square-shaped driving head, a male star-shaped driving head, a female nut-driving head, and a tool bit holder.

8. The threaded fastener driving tool of claim 1, wherein the proximal end portion comprises one of: (i) a shank of polygonal cross section configured to the removably coupled to a power tool; (ii) a tool handle; and (iii) a proximal driving head.

9. A threaded fastener driving tool defining a longitudinal axis, the threaded fastener driving tool comprising:
   a proximal end portion;
   a distal driving head having a central portion and a plurality of driving surfaces extending radially outward from the central portion, wherein each pair of adjacent driving surfaces defining a driving space therebetween, and the driving surfaces and driving spaces configured to engage a threaded fastener; and
   a torsion zone extending proximally from the driving head, the torsion zone including a plurality of helical grooves bounded by non-cutting surfaces, each helical groove in communication with and extending proximally from at least one of the driving spaces.

10. The threaded fastener driving tool of claim 9, wherein the helical grooves are configured to cause lengthening of the torsion zone when an input torque applied to the proximal end portion is insufficient to overcome an output resistance torque at the driving head.

11. The threaded fastener driving tool of claim 9, wherein the helical grooves are configured to at least partially untwist when an input torque applied to the proximal end portion is insufficient to overcome a torque resistance at the driving head.

12. The threaded fastener driving tool of claim 9, wherein the helical grooves have a twist direction that is the same as the twist direction of threads of a fastener to be inserted into a workpiece.

13. The threaded fastener driving tool of claim 9, wherein the torsion zone and helical grooves comprise a plurality of twisted wires or cables.

14. The threaded fastener driving tool of claim 13, wherein the plurality of twisted wires or cables comprise a first set of wires or cables composed of a first material having a first material property and a second set of wires or cables composed of a second material having a second, different material property.

15. The threaded fastener driving tool of claim 9, wherein the driving surfaces and driving spaces are configured as one of a flat head screwdriving head, a Phillips screwdriving head, a male hex-shaped driving head, a male square-shaped driving head, and a male star-shaped driving head.

16. The threaded fastener driving tool of claim 9, wherein the proximal end portion comprises one of: (i) a shank of polygonal cross section configured to the removably coupled to a power tool; (ii) a tool handle; and (iii) a proximal driving head.

17. A method of manufacturing a threaded fastener driving tool, the method comprising:
   twisting a plurality of wires or cables together in a helical pattern;
   heating and mechanically working the plurality of twisted wires or cables to form a torsion zone of the threaded fastener driving tool; and
   forming a driving head at a distal end portion of the torsion zone, the driving head configured to drive a threaded fastener.

18. The method of claim 17, wherein twisting the plurality of wires or cables comprises twisting a first set of wires or cables composed of a first material having a first material property together with a second set of wires or cables composed of a second material having a second, different material property.

19. The method of claim 17, wherein forming the driving head comprises forging the driving head from the distal end portion.

20. The method of claim 17, wherein forming the driving head comprises coupling a driving head component to the distal end portion.

* * * * *